United States Patent
Geosits et al.

(10) Patent No.: US 7,374,742 B2
(45) Date of Patent: May 20, 2008

(54) DIRECT SULFUR RECOVERY SYSTEM

(75) Inventors: Robert Geosits, Sugar Land, TX (US);
Charles Kimtantas, Sugar Land, TX (US)

(73) Assignee: Bechtel Group, Inc., San Francisco, CA (US)

( * ) Notice: Subject to any disclaimer, the term of this patent is extended or adjusted under 35 U.S.C. 154(b) by 777 days.

(21) Appl. No.: 10/742,450

(22) Filed: Dec. 19, 2003

(65) Prior Publication Data

US 2005/0135983 A1    Jun. 23, 2005

(51) Int. Cl.
C01B 17/04    (2006.01)

(52) U.S. Cl. .............. 423/573.1; 423/574.1; 423/576; 423/576.2; 423/576.8; 48/127.3; 48/127.5; 48/127.7

(58) Field of Classification Search .......... 423/573.1, 423/574.1, 576, 576.2, 576.8; 48/127.3, 48/127.5, 127.7
See application file for complete search history.

(56) References Cited

U.S. PATENT DOCUMENTS

| | | | |
|---|---|---|---|
| 3,849,540 A | * | 11/1974 | Maddox et al. ............. 423/224 |
| 4,280,990 A | * | 7/1981 | Jagodzinski et al. ...... 423/574.1 |
| 6,432,375 B1 | * | 8/2002 | Dalla Lana et al. ....... 423/573.1 |
| 6,531,103 B1 | * | 3/2003 | Hakka et al. ............. 423/242.2 |
| 6,962,683 B2 | | 11/2005 | Ganwal et al. |
| 7,056,487 B2 | | 6/2006 | Newby |
| 7,060,233 B1 | | 6/2006 | Srinivas et al. |
| 7,157,070 B2 | * | 1/2007 | Koss et al. ............... 423/573.1 |
| 2003/0194366 A1 | | 10/2003 | Srinivas et al. |

OTHER PUBLICATIONS

Arthur L. Kohl et al. "Gas Purification" (5th Ed.), 1997 Gulf Publishing Co., Book Division, P. O. Box 2608, Houston TX USA 77252-2608, ISBN 0-88415-220-0, pp. 699-703.*

"Selective Catalytic Oxidation of Hydrogen Sulfide for Simultaneous Coal Gas Desulfurization and Direct Sulfur Production (SCOHS) Systems Analysis" published Feb. 2002, U. S. Dept. of Energy, National Energy Technology Laboratory, Contract No. DE-AM26-99FT40465, pp. 1-59.*

* cited by examiner

*Primary Examiner*—Timothy C Vanoy
(74) *Attorney, Agent, or Firm*—Townsend and Townsend and Crew LLP

(57) ABSTRACT

The present invention provides a method for removing sulfur species from a gas stream without the use of a sulfur species removal process, such as an amine scrub. The sulfur species are removed by directly subjecting the gas stream to a sulfur recovery process, such as a Claus or sub-dewpoint Claus process at high pressure and moderate temperatures, wherein the sulfur recovery process comprises a catalyst which does not comprise activated carbon.

29 Claims, 3 Drawing Sheets

IGCC DIRECT SULFUR RECOVERY - SIMPLIFIED PROCESS FLOW DIAGRAM

DIRECT SULFUR RECOVERY SYSTEM

BACKGROUND OF THE INVENTION

Stringent environmental standards of emissions of sulfur compounds, together with low sulfur specifications for fossil fuel products, have resulted in making sulfur management critical in modern power generation and energy use. Some processes where such sulfur management is important include gasification or liquefaction of coal, smelting of various sulfide containing ores, the sweetening of sour natural gas, oil refining, petrochemical production, destructive distillation of coal and oil shale, and the production and use of hydrogen sulfide containing geothermal steam and liquid for generating electricity. As modern power generation equipment process fossil fuel products with higher sulfur contents, the need for more efficient, low cost sulfur recovery processes will also increase.

Sulfur species, such as $H_2S$ and COS, are generally removed from the gas or liquid stream before further processing occurs. The usual sulfur species removal process involves an amine or similar scrub to separate the sulfur species. This involves passing the gas stream through a liquid containing an amine such as monoethanolamine (MEA), diethanolamine (DEA), triethanolamine (TEA), diglycolamine (DGA), or monodiethanolamine (MDEA) with or without proprietary additives, or through use of a physical solvent such as methanol or sulfalane, or various combinations of these. The sulfur species are retained in the liquid solution as a result of their reaction with the amines and or physical absorbtion. Once most of the amines in the solution have reacted or the solvent is loaded, the amine solution is regenerated in a step known as stripping. Here, the sulfur species are liberated from the solution by pressure reduction, the application of heat to increase vapor pressure, the cleavage of the nitrogen-sulfur chemical bond, and the contacting of this material with a stripping medium such as steam. Next, in a process conducted separate from the original gas stream, the sulfur species are converted to elemental sulfur by a sulfur recovery process, which is typically carried out at low pressure. Examples of sulfur recovery processes include conventional, also known as modified, Claus processes, and sub-dewpoint Claus processes, such as cold-bed adsorption and associated tail gas conversion processes, which typically achieve over 98% sulfur recovery.

There are several problems with these sulfur species removal processes. First, in the process of removing the sulfur species from the gas stream, other acid gases, such as $CO_2$, and hydrocarbon fuel components are removed as well. The retention of these other acid gases or fuel components in the gas stream is desirable because their presence generates energy and/or power for example when the gas is burned and expanded in a gas turbine. Second, the sour gas stream is often at a much higher temperature and/or pressure than the sulfur species removal processes can accommodate. For example, sour syngas streams produced by the gasification of coal usually have temperatures above 250° F., while absorption or reaction of sulfur species with amine is favored at high partial pressures and low temperatures, typically 80-140° F. Adjusting the temperature and/or pressure of the sour gas stream to accommodate current sulfur species removal processes adds additional equipment and greater complexity to a plant with concurrent increases in cost. Therefore, processes that address these problems would help increase the efficiency of modern energy and power generation equipment.

One process is currently available which directly reacts the sulfur species in a syngas stream to sulfur without first treating them with a sulfur species removal system. This process is called "Selective Catalytic Oxidation of Hydrogen Sulfide" (SCOHS) (Department of Energy website, http://www.netl.doe.gov/coalpower/gasification/gas-clean/index.html (viewed Oct. 22, 2003)). This process has limitations however. First, the catalyst which converts the sulfur species to elemental sulfur comprises activated carbon, unlike the alumina catalyst used in most conventional and sub-dewpoint Claus sulfur recovery processes. Second, SCOHS operates at temperatures below 300° F., and preferably below 250° F., which is only slightly above the melting point of sulfur. A new process that would be adaptable for use with current Claus sub-dewpoint reactor and catalyst technology and would operate at higher temperatures would represent a significant advance in the art.

The present invention solves these problems and provides a new method of removing sulfur species from a sour gas stream.

BRIEF SUMMARY OF THE INVENTION

In a first aspect, the invention provides a method for producing a sweet gas stream from a sour gas stream, wherein the sweet gas stream comprises a decreased mole fraction of a sulfur species and an increased mole fraction of a fuel species in relation to the sour gas stream. This method comprises subjecting the sour gas stream to a sulfur recovery process, thus producing a sweet gas stream, without first subjecting the sour gas stream to a sulfur species removal process. The sulfur recovery process comprises a catalyst which does not contain activated carbon.

In an exemplary embodiment, the sour gas stream is not subjected to a change in pressure prior to the sulfur recovery process. In another exemplary embodiment, the sour gas stream is not subjected to a change in temperature prior to the sulfur recovery process. In yet another exemplary embodiment, the sulfur recovery process is conducted at a pressure of between about 10 atm and 110 atm. In another exemplary embodiment, the sulfur recovery process is conducted at a pressure of between about 20 atm and 50 atm. In some exemplary embodiments, the sulfur recovery process is conducted at a temperature of between about 250° F. and about 500° F. In other exemplary embodiments, the sulfur recovery process is conducted at a temperature of between about 300° F. and about 400° F.

In another exemplary embodiment, the sour gas stream comprises synthesis gas. In still another exemplary embodiment, a feedstock for production of the synthesis gas is selected from coal, petroleum coke, biomass, wood-based materials, agricultural wastes, tars, coke oven gas, asphalt, and combinations thereof. In an exemplary embodiment, the sour gas stream comprises natural gas. In yet another exemplary embodiment, the sour gas stream comprises refinery fuel gas. In still another exemplary embodiment, the sulfur species mole fraction in said sour gas stream is 10% or less. In another exemplary embodiment, the sulfur species mole fraction in said sour gas stream is 5% or less.

In an exemplary embodiment, the sulfur species removal process is selected from amine scrubbing, solvent absorption, adsorption, electrochemical oxidation, and membrane treatment. In another exemplary embodiment, the sulfur recovery process converts $H_2S$ to elemental sulfur. In yet another exemplary embodiment, in addition to the sour gas stream, a gas selected from air, $O_2$, $SO_2$ and combinations thereof, is introduced into the sulfur recovery process. In still another exemplary embodiment, elemental sulfur in the sulfur recovery process is a liquid. In some exemplary embodiments, the sulfur recovery process is a sub-dewpoint Claus process. In another exemplary embodiment, the sub-dewpoint Claus process is conducted at a pressure of between 10 atm and 110 atm. In yet another exemplary embodiment, the sub-dewpoint Claus process is a Richards Sulfur Recovery Process. In some exemplary embodiments, the sulfur recovery process decreases the mole fraction of sulfur species in the sweet gas stream by at least about 70%. In other exemplary embodiments, the sulfur recovery process decreases the mole fraction of sulfur species in the sweet gas stream by at least about 98%. In an exemplary embodiment, the sulfur recovery process increases the $CO_2$ mole fraction in the sweet gas stream.

In an exemplary embodiment, a property of the sour gas stream is altered, such as the humidity, temperature, pressure, and combinations thereof. In some exemplary embodiments, the sour gas stream is subjected to a steam generation process. In other exemplary embodiments, the sweet gas stream is subjected to a steam generation process. In some exemplary embodiments, particulate material is removed from the sour gas stream. In other exemplary embodiments, particulate material is removed from the sweet gas stream. In some exemplary embodiments, the method further comprises contacting the sweet gas stream with an adsorbent filter to capture residual particles. In other exemplary embodiments, the method further involves subjecting the sweet gas stream to a $CO_2$ recovery process, thus producing a low $CO_2$ sweet gas stream. In an exemplary embodiment, the method further comprises an adsorbent filter which is selected from activated carbon, coal, and coke. In another exemplary embodiment, the sulfur recovery process further comprises a catalyst. In yet another exemplary embodiment, the catalyst comprises solid sulfur and liquid sulfur, and the method further comprises regenerating the catalyst. In still another exemplary embodiment, regenerating the catalyst comprises a) depressurizing the sulfur recovery process; b) heating the catalyst; c) converting the solid sulfur and the liquid sulfur into sulfur vapor; d) removing the sulfur vapor from the sulfur recovery system; and e) cooling the catalyst. In some embodiments, the method further comprises regenerating the adsorbent filter. In these exemplary embodiments, regenerating the adsorbent filter comprises a) using steam or clean gas stream to absorb the residual particles; and b) subjecting the product of step (a) to a sulfur recovery process. In an exemplary embodiment, the method further comprises washing the sweet gas stream with water. In another exemplary embodiment, the method further comprises separating the elemental sulfur by using an apparatus selected from a knock-out drum, coalescer, and filter.

In an exemplary embodiment, the method further comprises transferring the sweet gas stream to a gas turbine for power generation. In an exemplary embodiment, the method further comprises transferring the sweet gas stream to a shift reactor for recovery of a gas selected from $H_2$, CO, $CO_2$, and combinations thereof. In an exemplary embodiment, the sweet gas stream is used in an integrated gasification combined cycle (IGCC) power plant. In an exemplary embodiment, the low $CO_2$ sweet gas stream is used in residential applications. In an exemplary embodiment, the sweet gas stream is used in producing a product selected from alcohols, ammonia, fertilizers, and Fischer-Tropsch liquids.

DETAILED DESCRIPTION OF THE INVENTION

Introduction

Figure 1:
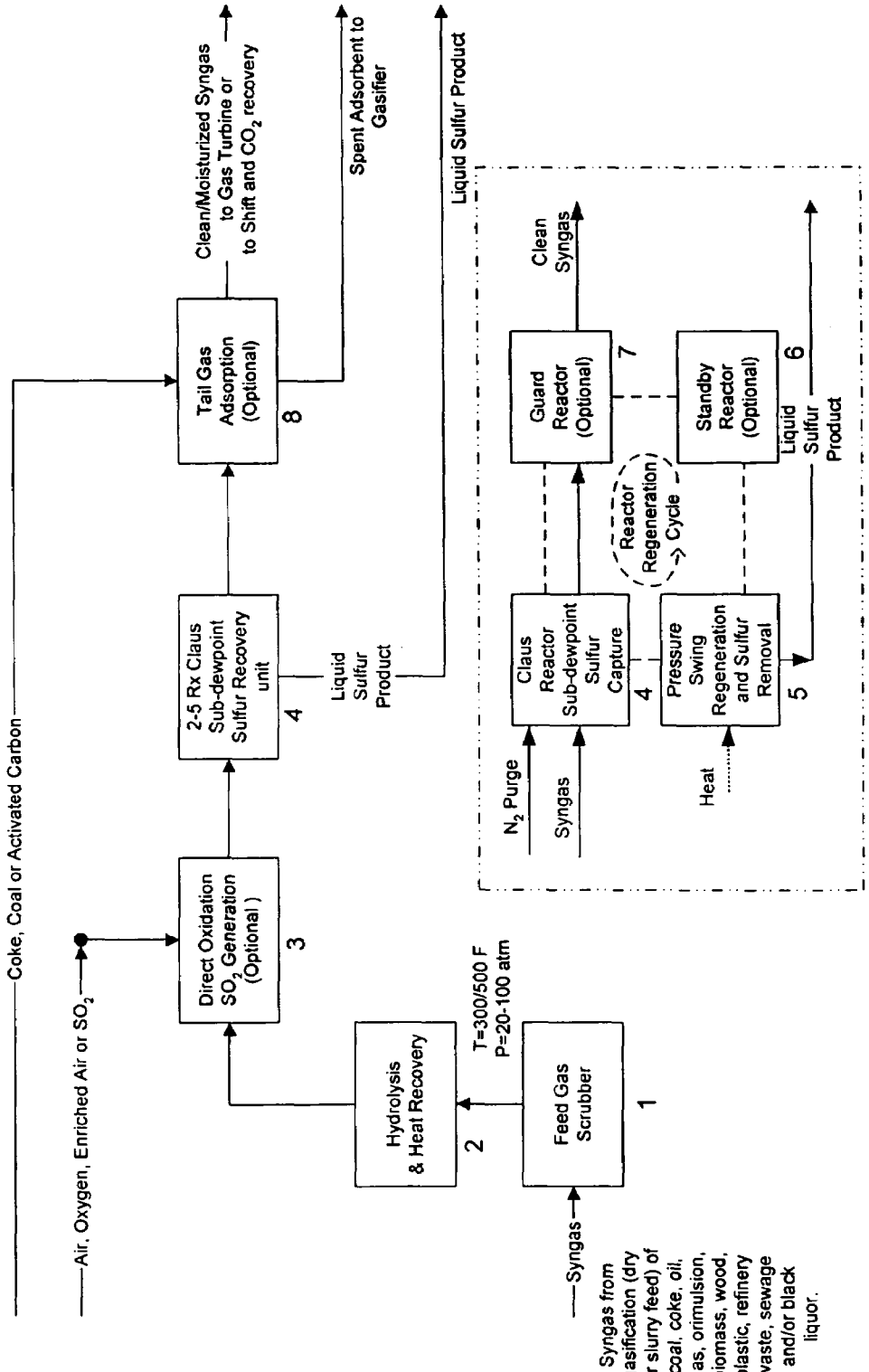
FIG. 1 is a block flow diagram of the IGCC direct sulfur recovery system of the invention.

The method of the invention provides a new approach to sour gas treatment. In this method, a dilute sour gas stream is directly treated by a sulfur recovery process, specifically a pressurized sub-dewpoint Claus process. Direct treatment provides a number of advantages while still achieving low sulfur emissions. First, the need for treating the gas stream with a sulfur species removal process, such as an amine scrub, is removed. Second, the gas stream does not need to have its temperature or pressure reduced or increased between exiting the gasification area and entering the sulfur recovery process. Third, the amount of additional equipment and complexity in a power generation plant is greatly reduced. This combination of maintaining low sulfur emissions while simplifying the operation of the power generation plant makes this invention a significant contribution to the art.

Definitions

Sulfur species, as used herein, refers to sulfur containing compounds such as $H_2S$, COS, $CS_2$, $SO_2$ and elemental sulfur, e.g. $S_2$, $S_6$, $S_8$. Sulfur species in this invention can exist in any phase, e.g. gaseous, liquid, and solid.

Fuel species, as used herein, refers to combustible species such as CO, $H_2$, $CH_4$, $C_2H_6$, and $C_3H_8$. Fuel species in this invention can exist in any phase, e.g. gaseous, liquid, and solid.

Residual particles, as used herein, refers to any matter in the solid phase that is present in a gas stream after the gas stream has left a Claus reactor.

Synthesis gas, as used herein, refers to a mixture of CO and $H_2$ derived from the combustion of coal, petroleum coke, biomass, wood-based materials, agricultural wastes, tars, coke oven gas, and/or asphalt. CO and $H_2$ are usually found in combination with $CO_2$ and $H_2O$ and may include various inert materials such as $N_2$, Ar, and other trace components such as ammonia, HCN, formic acid, tars, trace metals, and carbon dust.

Sulfur Recovery Process, as used herein, refers to the conversion of sulfur species into elemental sulfur, its separation from a gas stream, and its recovery as elemental sulfur.

Sub-dewpoint Claus process, as used herein, refers to a sulfur recovery process where the reactor's temperature and pressure conditions are maintained below the dew point of sulfur. Thus, in this reactor, after sulfur species are converted to elemental sulfur, the elemental sulfur condenses into either a liquid or solid state.

The Invention

The sour gas treatment system of the invention can be used in a variety of applications, from industrial to residential. In one embodiment, the sour gas treatment system is used in an integrated gasification combined cycle (IGCC) power generating plant. The IGCC process relies on two-stage combustion with clean up between the stages. The first stage includes a gasifier for partial oxidation of a fuel, i.e., coal, coke, Orimulsion™, waste, biomass, wood chips, heavy fuel oils, petroleum coke, refinery waste, or the like. The second stage utilizes a gas turbine combustor for burning the fuel gas produced by the gasifier to complete the combustion process. In a simple combined cycle power generating system, there is provided a gas turbine, one or more steam turbines, one or more generators and a heat recovery steam generator (HRSG). The gas turbine and steam turbine may be coupled to a single generator in a tandem arrangement or multi-shaft combined cycle systems may be provided having one or more gas turbines, generators and heat recovery steam generators (HRSGs) for supplying steam through a common header to a separate steam turbine generator unit. In the combined cycle, heat from the gas turbine exhaust is provided in heat exchange relation with a working fluid in the heat recovery steam generator for powering the steam turbines and, hence, generating electricity or mechanical work. IGCC systems are attractive because of their high efficiency and because they can use relatively abundant and/or inexpensive energy sources.

The method of the present invention can be used in conjunction with substantially any method of producing a fuel gas including, but not limited to, fixed bed gasification where lump coal is supported on a grate or by other means and the flow of gas and coal may be concurrent or counter-current; fluidized bed gasification where crushed or fine coal is fluidized by the gasifying medium, giving an expanded fuel bed that can be visualized as boiling liquid; and suspension or entrainment gasification where fine coal is suspended in the gasifying medium such that the fine coal particles move with the gasifying medium either linearly or in a vortex pattern.

By way of exemplification and not limitation, one example of a fixed bed gasifier is that which forms the subject matter of U.S. Pat. No. 3,920,417, which provides a method of producing a low BTU fuel gas by the reaction of a carbonaceous fuel with free oxygen and steam in a downdraft fixed bed gasifier. A subsequent modification in the design of fixed bed gasifiers wherein a second stage has been added in cooperative association with the fixed bed gasifier forms the subject matter of U.S. Pat. No. 4,069,024, providing a method and apparatus for directing a low BTU content synthesis gas through a second stage having a serially interconnected pyrolyzer of so-called "spouting bed" design wherein the hot synthesis gas from the fixed bed gasifier is contacted by a hot carbonaceous charge and lime to utilize its high sensible heat to produce a cool, higher BTU product.

Examples of entrainment, i.e., suspension, gasification, are found in the art. By way of exemplification and not limitation in this regard, one such example of an entrainment gasification process is that which forms the subject matter of U.S. Pat. No. 4,158,552, in which a method is disclosed for forming a high temperature product gas stream by burning primarily char with the existing air supply. Another example of an entrainment gasification process is set forth in U.S. Pat. No. 4,343,627. Yet another example of an entrained gasification process is found in U.S. Pat. No. 4,610,697, providing a pressurized coal gasifier for producing a clean, particulate free fuel gas suitable for use in a gas turbine-generator or a feedstock for a methanation or other chemical process.

In addition to synthesis gas produced via gasification, many other fuels contain $H_2S$ and other sulfur species. These fuels include refinery fuel gas, and natural gas. $H_2S$ and possibly COS are the key components that must be removed from the combustion gases prior to their release into the environment. The present invention provides a method of producing a sweet gas stream appropriate for incorporation into an IGCC system or similar fuel gas system. The method involves directly subjecting the sour gas stream to a sulfur recovery process, without first subjecting the sour gas stream to a sulfur species removal process. Once the sour gas stream is produced from the gasifier, and optionally moisturized, the pressurized sour gas stream at moderate termperatures is directed to a sulfur recovery process.

A variety of sulfur recovery processes are available. These processes can be divided into two sections: "direct oxidation" and "thermal oxidation". In direct oxidation, the sulfur species are catalytically converted to elemental sulfur in one step. A variety of catalysts are used to accomplish this conversion at a variety of temperatures and pressures. Among the catalysts used are alumina, iron and/or chromium deposited on α-alumina and/or silicon substrates (used in Comprimo SUPERCLAUS™ processes), iron based metal oxides applied on Al/Si-based carriers (used in Parsons Hi-Activity Process), magnesium chromate and/or vanadium oxides (used in Boreskov process), and titanium oxide or dioxide (see U.S. Pat. No. 4,957,724) (used in Linde's CLINSULF®, Mobil's MODOP, and Elf Aquitaine Production's HYDROSULFREEN, OXYSULFREEN, and Lean Gas processes). Further information on these catalysts and sulfur recovery processes are presented in the "Review of the $H_2S$ Direct Oxidation Processes", by Wendell Kensell and Dennis Leppin, presented at the "Seventh Gas Research Institute Sulfur Recovery Conference", 1995, which is herein incorporated by reference.

Thermal oxidation processes include a first step where a portion of the sulfur species are oxidized via combustion to sulfur dioxide. The second step is the direct oxidation step mentioned above. Examples of thermal oxidation processes include the conventional Claus process and the sub-dewpoint Claus process. Further information on Claus processes is available in "Sulfur Compounds", *Kirk-Othmer Encyclopedia of Chemical Technology*, Vol. 23, 4th ed., Wiley-Interscience, 1992, which is herein incorporated by reference.

In some sulfur recovery processes, the sulfur species are converted to elemental sulfur. In some processes, the elemental sulfur is maintained as a vapor in the reactor, but is sent to a separate condenser module where the vapor is cooled and converted to a liquid. Conventional Claus processes are an example of this type of sulfur recovery process. In other sulfur recovery processes, the reactor is maintained as a temperature/pressure regime that causes the sulfur vapor to condense and form liquid sulfur inside the reactor, as opposed to a separate compartment. This is known as a sub-dewpoint Claus process, which can be used with direct oxidation or thermal oxidation processes. Examples of a sub-dewpoint Claus process are the Amoco Cold Bed Absorption Process and the Elf Aquitaine Sulfreen Process.

Direct oxidation over catalyst can be used if the acid gas stream contains a low concentration of $H_2S$ (less than 5%). An example of this technology is Selectox processs, which resembles a modified Claus process, except the burner and the reaction furnace are replaced by a bed of Selectox catalyst. This allows air to convert sulfur species to elemental sulfur at low pressures prior to additional sulfur recovery over conventional Claus catalysts.

All of the above processes are specific to low pressure operation with acid gases from a $H_2S$ scrubbing system. The only known high pressure Claus sub-dewpoint process for treatment of compressed acid gases is the Richards Sulfur Recovery Process, described in Jagodzinski, U.S. Pat. No. 4,280,990, herein incorporated by reference. This invention extends the Richards Process to the unique application on high pressure syngas and fuel gas with a low concentration of $H_2S$ and other sulfur species, at moderate temperature (250-500° F.), including addition of an oxidizing agent into the high pressure gas stream to allow partial oxidation of sulfur species to sulfur and $SO_2$ over an appropriate catalyst.

The invention provides a number of advantages over known methods. Unlike previous sulfur recovery processes, the present invention provides a process that does not require the sulfur species to be separated from the gas stream for treatment. Removal of the separation step not only reduces the number of process steps, but also reduces process complexity. In addition, removal of the separation step also removes the need for separate sulfur removal and sulfur production facilities, thus reducing the footprint of the plant. Removing the amine treatment step also removes the need to adjust the temperature/pressure of the gas stream to a regime that will not destroy the amine solutions. These simplifications in sour gas stream processing represents a significant advance in the art.

The Methods

FIG. 1 illustrates an exemplary process of the invention. A fuel gas at a temperature of from about 250 to about 3000° F. is fed from the gasifier to feed gas scrubber 1 to cool the gas by evaporation and moisturization and to simultaneously remove particulate material. From the feed gas scrubber, the gas, which is at 300 to 500° F. and 20 to 100 atm, flows to hydrolysis and heat recovery unit 2, where the temperature and pressure of the gas stream is adjusted to meet the downstream requirements.

The sour gas stream is then passed directly to the sulfur recovery process. The first step for sulfur recovery in this exemplary process is thermal oxidation unit 3. In the thermal oxidation section, air, enriched air, oxygen, $SO_2$, or a combination thereof, is introduced and a portion of the sulfur species contained in the sour gas stream is oxidized through combustion, which results in the formation of $SO_2$. Afterward, the gas stream is further processed in the catalytic unit 4 of the sulfur recovery process, which is a sub-dewpoint Claus process in this example. In the sub-dewpoint Claus process, the sulfur species is converted to liquid elemental sulfur and is collected on the catalyst. In this process, the liquid sulfur is removed during catalyst regeneration. Sub-dewpoint Claus process reactors can be connected in series of between 2 and 5 in order to subject the sour gas stream to several iterations of sulfur removal. This is in addition to the one to three reactors (one in regeneration step 5, one in the optional standby reactor 6, and one in the optional guard reactor 7) shown in the reactor regeneration cycle offset box.

When the catalyst in one of the sub-dewpoint Claus process reactors loses its effectiveness, the reactor is taken off-line for regeneration. The sour syngas is routed to the next reactor online and all the reactors move one step closer to regeneration. Also, the last reactor or the optional guard reactor is replaced with a standby Claus reactor 7. In this way, the syngas flows from the most used or loaded reactor to the least used or recently regenerated reactor, and the reactors cycle counter-clockwise through the system. In reactor 5, the loaded ineffective reactor is regenerated by a sequence of steps that remove the adsorbed sulfur and restore the bed catalytic activity. This sequence involves nitrogen purging of the reactor, reactor depressurization, heating the reactor with hot recycled nitrogen to remove sulfur, cooling the sweep gas by low pressure steam generation to condense and separate sulfur, repressurizing the sweep gas in a blower and reheating sweep gas, recycling the nitrogen gas without heating in order to cool the reactor after regeneration, and repressurizing the reactor with sweet syngas.

If the sulfur recovery efficiency required, due to environmental regulations, is greater than that available from the sulfur recovery process, a tail gas adsorber 8 is optionally added to the back-end of the sulfur recovery unit. The tail gas adsorber system preferably uses activated carbon, coal, or coke as an adsorbent without regeneration. The loaded adsorbent is then returned to the gasifier for destruction and recycling of the sulfur for recovery. After leaving tail gas adsorber 8, the sweet gas stream is sent to a gas turbine for power generation or goes to further gas processing; for example, to water/gas shift reactions and possible $CO_2$ recovery.

Figure 2:
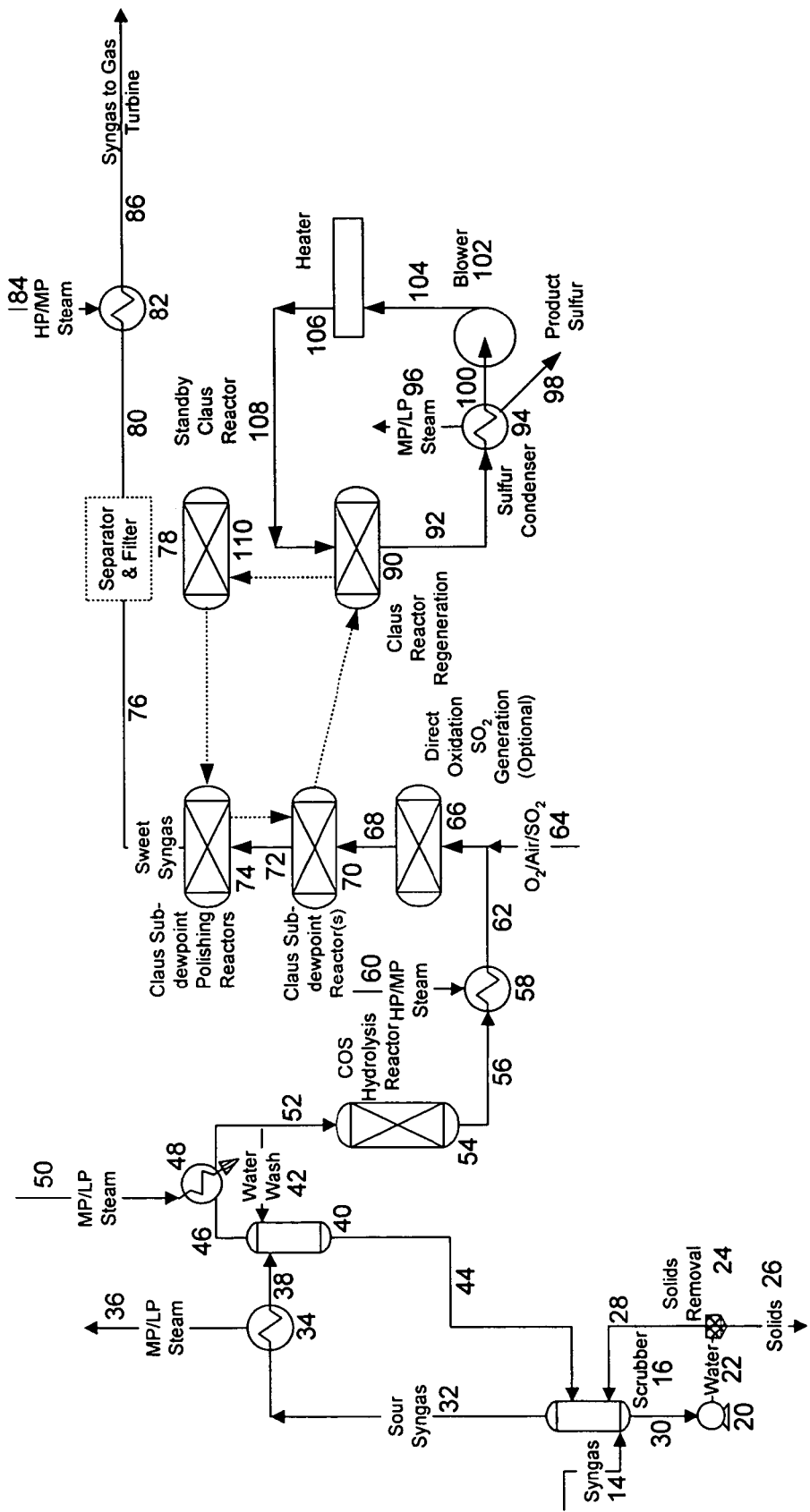
FIG. 2 is a process flow diagram of the IGCC direct sulfur recovery system of the invention.

FIG. 2 sets forth an exemplary system of the invention as applied to an IGCC plant. Sour syngas enters the system through conduit 14 and is passed into feed gas scrubber 16 to cool and moisturize the sour gas stream and remove particulate matter. The water for the feed gas scrubber is brought in through conduit 44. Water then flows from 16 through conduit 30 to pump 20 and through conduit 22 to particulate removal hydroclone vessel 24 where the solids are separated out of the water solution. These solids are then removed through conduit 26. The partially cleansed water is then introduced into the feed gas scrubber via conduit 28.

The sour gas stream is then introduced to HRSG 34 via conduit 32. In the HRSG, the heat given off from the sour gas stream is used to produce steam which leaves the HRSG through conduit 36.

The sour gas stream is then subjected to a second feed gas scrubber 40 via conduit 38. The water utilized for this second feed gas scrubber is introduced via conduit 42. After treatment, the water is then channeled to the particulate removal cycle 20-30 via conduit 44.

The sour syngas stream is then introduced to syngas heater 48 via conduit 46, where the sour syngas stream is superheated with steam which enters the heater through conduit 50.

The COS in the superheated sour gas stream is then converted to $H_2S$ by COS hydrolyzer 54. The sour gas stream is introduced to COS hydrolyzer 54 via conduit 52. The ideal temperature range for the operation of a COS hydrolyzer is 350 to 450° F.

The sour gas stream is then introduced to a heater 58 via conduit 56. The heat for this process is supplied by steam supplied via conduit 60.

After heating, the sour syngas stream is introduced into the thermal oxidation reactor of the Claus process 66 via conduit 62. Air, enriched air, $O_2$, and/or $SO_2$ is connected to conduit 62 by conduit 64, and thus also enters the thermal oxidation reactor of the sub-dewpoint Claus process 66. In 66, a portion of the sulfur species contained in the sour gas stream is oxidized through combustion, which results in the formation of $SO_2$.

The syngas containing minimal COS and $SO_2$ product produced in 66 is then channeled to the catalytic reactor of the sub-dewpoint Claus process 70 via conduit 68. Another option is to not include units 58 and 66, and to add air, oxygen, and/or $SO_2$ directly to the gas stream going to reactor 70. In this option, COS hydrolysis and $H_2S$ oxidation would take place on the Claus sub-dewpoint catalyst. In 70, the sulfur species is catalytically converted to elemental sulfur. The elemental sulfur collects as a liquid inside 70.

The sour gas stream is then introduced to a second sub-dewpoint Claus catalytic reactor 74 via conduit 72. Catalytic sub-dewpoint Claus process reactors can be connected in a series of between 2 and 5 reactors, in addition to the reactor in regeneration 90 and a standby reactor.

When the catalysts in one of the sub-dewpoint Claus process reactors loses its effectiveness, the reactor is taken off-line and moved to the Claus reactor regeneration position 90. Regeneration of the reactor occurs is a sequence of steps that removes the adsorbed sulfur and restores the bed catalytic activity. This sequence involves nitrogen purging of the reactor, reactor depressurization, heating the reactor in position 90 with hot recycled nitrogen to remove sulfur and thus generating a 'sweep gas', sending the sweep gas to a sulfur condenser 94 via conduit 92. In 94, the sweep gas is cooled, heat is given off from the sweep gas which is used to produce steam which leaves 94 through conduit 96. Elemental sulfur precipitates out of the sweep gas and is removed as product sulfur via conduit 98. The sweep gas is then channeled to a blower 102 via conduit 100 where the sweep gas is pressurized. The sweep gas is then channeled to a heater 106 via conduit 104 where the sweep gas is heated. The sweep gas is then returned to regeneration position 90 via conduit 108. After sulfur is removed, circulating nitrogen, with the regeneration heaters off, cools the reactor. The reactor is then repressurized with clean syngas. The Claus reactor which was in position 90 is now regenerated and is moved to standby Claus reactor position 110. Once the Claus reactor in position 70 is in need of regeneration, this reactor will be moved to position 90, the reactor in position 74 will be moved to position 70, and the reactor in position 110, will be moved to position 74. In this way, the syngas flows from the most used or loaded reactor to the least used or recently regenerated reactor, and the reactors cycle counter-clockwise through the system.

After leaving the sulfur recovery unit, the sour gas stream is largely free of sulfur species contamination and is therefore a sweet gas stream. The sweet gas stream is then channeled to a separator/filter 78 via conduit 76. The separator/filter is a dry system which captures dust and sulfur to protect machinery downstream of the process, such as a gas turbine.

Finally, the sweet gas stream is introduced to a second heater 82 via conduit 80. The heat for this process is supplied by steam supplied via conduit 84. After heating, the sweet gas stream is channeled to a gas turbine via conduit 86.

Figure 3:
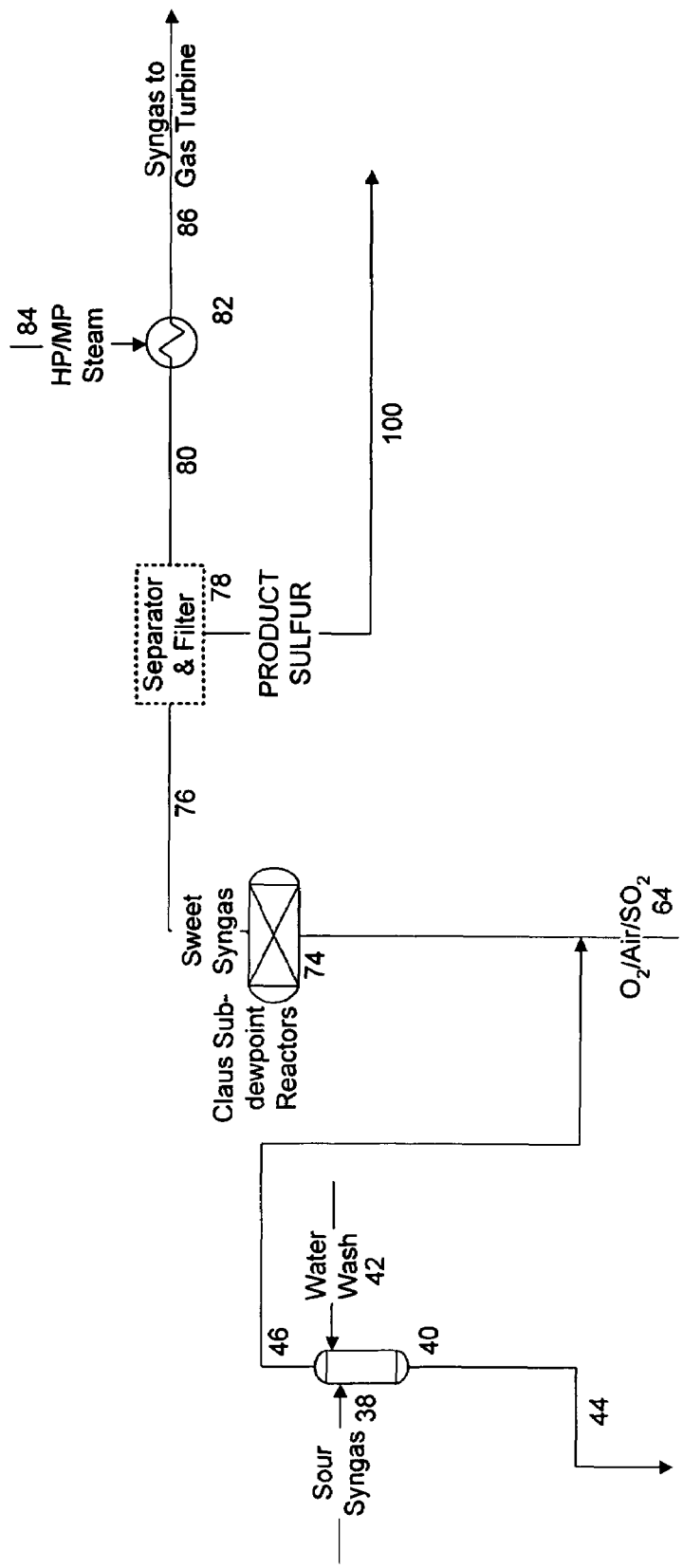
FIG. 3 is a simplified process flow diagram of the IGCC direct sulfur recovery system of the invention.

FIG. 3 illustrates a simplified version of the invention. Sour syngas is subjected to a feed gas scrubber 40 via conduit 38. The water utilized in 40 is introduced via conduit 42. After treatment, the water is then removed from the system via conduit 44. The cooled and moisturized gas from the feed gas scrubber 40, in conduit 46, is mixed with air, $O_2$ and/or $SO_2$ supplied via conduit 64, and flows directly to the Claus sub-dewpoint reactor 74. Here the catalyst promotes the $H_2S$ oxidation reaction along with COS hydrolysis and conversion of sulfur species to liquid sulfur. The liquid sulfur is allowed to build up on the catalyst to the point where the net product sulfur leaves 74 with the reacted gas through conduit 76. Product sulfur is separated in a KO drum and a filter, and exits via conduit 100. The clean syngas is introduced to a heater 82 via conduit 80 and is heated with steam provided by conduit 84. The sweet gas is then sent to the gas turbine or other user via conduit 86.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method for producing a sweet gas stream from a sour gas stream, wherein the sweet gas stream comprises a decreased mole fraction of a sulfur species and an increased mole fraction of a fuel species in relation to the sour gas stream, said method comprising:
    (a) subjecting the sour gas stream to a sulfur recovery process, thus producing a sweet gas stream, without first subjecting the sour gas stream to a sulfur species removal process, said sulfur recovery process comprising a catalyst which does not comprise activated carbon, wherein said sulfur recovery process is a sub-dewpoint Claus process conducted at a pressure of between 10 atm and 110 atm and at a temperature of between about 300° F. and about 500° F., wherein the sulfur recovery process converts $H_2S$ to elemental sulfur.

2. The method according to claim 1, wherein said sour gas stream is not subjected to a change in pressure prior to step (a).

3. The method according to claim 1, wherein said sour gas stream is not subjected to a change in temperature prior to step (a).

4. The method according to claim 1, wherein said sulfur recovery process is conducted at a pressure of between about 20 atm and 50 atm.

5. The method according to claim 1, wherein said sulfur recovery process is conducted at a temperature of between about 300° F. and about 400° F.

6. The method according to claim 1, wherein the sour gas stream comprises natural gas.

7. The method according to claim 1, wherein the sour gas stream comprises synthesis gas.

8. The method according to claim 1, wherein the sour gas stream comprises refinery fuel gas.

9. The method according to claim 1, wherein the sulfur species mole fraction in said sour gas stream is 10% or less.

10. The method according to claim 1, wherein said sulfur species removal process is selected from amine scrubbing, solvent absorption, adsorption, electrochemical oxidation, and membrane treatment.

11. The method according to claim 1, wherein, in addition to the sour gas stream, a gas selected from air, $O_2$, $SO_2$ and combinations thereof, is introduced into said sulfur recovery process.

12. The method according to claim 1, wherein said elemental sulfur is a liquid.

13. The method according to claim 12, wherein said elemental sulfur collects on said catalyst, and said method further comprises regenerating said catalyst.

14. The method according to claim 13, wherein said regenerating comprises:
    a) depressurizing said sulfur recovery process;
    b) heating said catalyst;
    c) converting said solid sulfur and said liquid sulfur into sulfur vapor;
    d) removing said sulfur vapor from said sulfur recovery system; and
    e) cooling said catalyst.

15. The method according to claim 1, wherein said sulfur recovery process decreases the mole fraction of sulfur species in the sour gas stream by at least about 70%.

16. The method according to claim 1, wherein said sulfur recovery process decreases the mole fraction of sulfur species in the sour gas stream by at least about 98%.

17. The method according to claim 1, wherein said sulfur recovery process increases the $CO_2$ mole fraction in said sour gas stream.

18. The method according to claim 1, wherein a property of said sour gas stream is altered, said property selected from humidity, temperature, pressure, and combinations thereof.

19. The method according to claim 1, further comprising subjecting said sour gas stream to a steam generation process.

20. The method according to claim 1, further comprising subjecting said sweet gas stream to a steam generation process.

21. The method according to claim 1, further comprising removing particulate material from said sour gas stream.

22. The method according to claim 1, further comprising removing particulate material from said sweet gas stream.

23. The method according to claim 1, further comprising contacting said sweet gas stream with an adsorbent filter to capture residual particles.

24. The method according to claim 23, wherein said adsorbent filter is selected from activated carbon, coal, and coke.

25. The method according to claim 23, further comprising regenerating said adsorbent filter.

26. The method according to claim 25, wherein said regenerating comprises:
 a) using steam or clean gas stream to absorb said residual particles; and
 b) subjecting the product of step (a) to said sulfur recovery process.

27. The method according to claim 1, further comprising subjecting said sweet gas stream to a $CO_2$ recovery process, thus producing a low $CO_2$ sweet gas stream.

28. The method according to claim 1, further comprising washing said sweet gas stream with water.

29. The method according to claim 1, further comprising separating said elemental sulfur by using an apparatus selected from a knock-out drum, coalescer, and filter.

* * * * *